United States Patent
Cooke et al.

(10) Patent No.: US 10,353,590 B2
(45) Date of Patent: Jul. 16, 2019

(54) METHODS AND SYSTEMS FOR PRE-PROCESSING SENSOR MEASUREMENTS

(71) Applicant: HEWLETT PACKARD ENTERPRISE DEVELOPMENT LP, Houston, TX (US)

(72) Inventors: Raymond Mark Cooke, El Granada, CA (US); Eric Forgette, Clarence, NY (US); Razvan George Costea, Durham, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/159,490

(22) Filed: May 19, 2016

(65) Prior Publication Data

US 2017/0336986 A1    Nov. 23, 2017

(51) Int. Cl.
*G06F 3/06*      (2006.01)
*G06F 9/455*    (2018.01)
(Continued)

(52) U.S. Cl.
CPC .......... *G06F 3/0611* (2013.01); *G06F 3/0653* (2013.01); *G06F 3/0665* (2013.01);
(Continued)

(58) Field of Classification Search
CPC .......... G06F 3/06; G06F 9/455; G06F 3/0611; G06F 9/45558; G06F 2009/45583; G06F 3/0689; G06F 3/0665; G06F 11/3452; G06F 3/0653; G06F 11/3034; G06F 11/3419; H04L 43/0852
See application file for complete search history.

(56) References Cited

U.S. PATENT DOCUMENTS 7,805,266 B1 *  9/2010 Dasu ................ G06F 17/30507
                                                                702/179
8,352,938 B2    1/2013 Hunt et al.
(Continued)

OTHER PUBLICATIONS

Dieckhans, "Troubleshooting Storage Performance in vSphere—Part 1—The Basics", VMware vSphere Blog (May 20, 2012), http://blogs.vmware.com/vsphere/2012/05/troubleshooting-storage-performance-in-vsphere-part-1-the-basics.html, 5 pages.
(Continued)

*Primary Examiner* — David Yi
*Assistant Examiner* — Zubair Ahmed

(57) ABSTRACT

Described herein are techniques to decompose a measurement of the latency experienced by a virtual machine into its additive components (e.g., host latency, kernel latency, network latency and storage latency). The host latency may be determined as the aggregate latency reported from the virtual disk of the virtual machine minus the aggregate latency reported from the datastore on which the virtual disk is stored. The network latency may be determined as the device latency reported from the datastore minus the storage latency reported by a storage system. Various sensor measurements (e.g., aggregate latency reported from the virtual disk and/or datastore) may be first pre-processed to compensate for non-idealities before being combined with other sensor measurements.

20 Claims, 8 Drawing Sheets

(51) Int. Cl.
*H04L 12/26* (2006.01)
*G06F 11/30* (2006.01)
*G06F 11/34* (2006.01)

(52) U.S. Cl.
CPC ........ *G06F 3/0689* (2013.01); *G06F 9/45558* (2013.01); *G06F 11/3034* (2013.01); *G06F 11/3419* (2013.01); *G06F 11/3452* (2013.01); *H04L 43/0852* (2013.01); *G06F 2009/45583* (2013.01)

(56) References Cited

U.S. PATENT DOCUMENTS

| | | | |
|---|---|---|---|
| 8,489,699 B2 | 7/2013 | Goggin et al. | |
| 8,656,018 B1 | 2/2014 | Keagy et al. | |
| 8,661,299 B1 | 2/2014 | Ip | |
| 8,665,893 B2 | 3/2014 | Tsirkin et al. | |
| 8,725,973 B2 | 5/2014 | Prahlad et al. | |
| 8,745,237 B2 | 6/2014 | Tsirkin et al. | |
| 8,832,330 B1* | 9/2014 | Lancaster | H04L 43/0852 710/18 |
| 9,135,033 B1 | 9/2015 | Lee et al. | |
| 9,323,599 B1 | 4/2016 | Iyer et al. | |
| 9,417,912 B2 | 8/2016 | Suh et al. | |
| 9,465,635 B2* | 10/2016 | Holler | G06F 9/45533 |
| 2014/0059207 A1* | 2/2014 | Gulati | G06F 9/505 709/224 |
| 2014/0130055 A1* | 5/2014 | Guha | G06F 3/0604 718/104 |
| 2015/0066857 A1 | 3/2015 | Dayai et al. | |
| 2016/0048350 A1 | 2/2016 | Gostev et al. | |
| 2016/0203013 A1 | 7/2016 | Bayapuneni et al. | |
| 2017/0116319 A1* | 4/2017 | Zhou | G06F 17/30598 |

OTHER PUBLICATIONS

"Disk I/O Counters", VMware, Inc., Revision May 28, 2010, Version 4.1, https://www.vmware.com/support/developer/vc-sdk/visdk41pubs/ApiReference/disk_counters_html, 3 pages.
Sreegiriraju, "Tintri for VDI Deployments", Tintri, Inc., Technical White Paper (2012), 10 pages.
"The Architecture of VMware ESXi", VMware White Paper (latest revision: Oct. 14, 2008),10 pages.
"VMware Disk Latency", VMware Disk Latency—Heroix BlogHeroix Blog (Posted on Aug. 22, 2013), http://www.heroix.com/blog/vmware-disk-latency/, 2 pages.
European Patent Office, "International Search Report," dated Aug 18, 2017, issued for International application No. PCT/US2017/033121, pp. 4.
European Patent Office, "Written Opinion of the International Searching Authority," Aug 18, 2017, issued for International application No. PCT/US2017/033121, pp. 6.
Chart Chaubai, "The Architecture of VMware ESXi"; Oct. 24, 2008; Whitepaper; VMWare; Revision: 20081024 WP-030-PRD-02-02: p. 1-10.
Joseph Dieckhans, "Troubleshooting Storage Performance in vSphere—Part 1—The Basics"; May 30, 2012; p. 1-5; <http://blogs.vmware.com/vsphere/2012/05/troubleshooting-storage-performance-in-vsphere-part-1-the-basics.html#comment-6288>.

* cited by examiner

METHODS AND SYSTEMS FOR PRE-PROCESSING SENSOR MEASUREMENTS

FIELD OF THE INVENTION

The present invention relates to pre-processing sensor measurements of a host device and/or storage system, and more particularly relates to pre-processing the sensor measurements in order to decompose an aggregate latency measurement into its additive latency components.

BACKGROUND

One important performance measure of the storage platform supporting a virtual machine is the latency that the virtual machine experiences when the virtual machine submits a request (e.g., read request, write request) to the storage platform. The storage platform may include a host device (i.e., a physical device) on which the virtual machine is instantiated. The storage platform may include a hypervisor (i.e., a software program running on the host device) that interfaces the virtual machine with the physical hardware of the host device. The storage platform may include a network that interfaces the hypervisor to a remote storage system (i.e., remote from the perspective of the host device). The storage platform may also include the remote storage system that carries out the request (e.g., provides data requested by a read request, writes data from write request onto a storage medium). Techniques are discussed herein below to analyze the latency experienced by the virtual machine in order to assist a system administrator (or other individual) diagnosis the primary cause of the latency experienced by the virtual machine.

SUMMARY OF THE INVENTION

In accordance with one embodiment, a measurement of the latency (e.g., read latency, write latency) experienced by a virtual machine may be decomposed into its additive latency components, including the host latency, kernel latency, network latency and storage latency.

The host latency may be the average amount of time taken by the virtual machine to process a read or write command (including latency due to the application and guest operating system of the virtual machine), and may be determined as the aggregate latency reported from the virtual disk of the virtual machine (e.g., reported via an application program interface (API) of a hypervisor manager) minus the aggregate latency reported from the datastore on which the virtual disk is stored (e.g., reported via an API of the hypervisor manager). If not already apparent, the terminology "host latency" does not refer to the entire latency due to the host device, but only the latency caused by the virtual machine running on the host device. While the kernel latency (described below) is also associated with the host device, the kernel latency is typically not included within the host latency.

The kernel latency may be the average amount of time taken by the hypervisor (specifically the kernel of the hypervisor) to process a read or write command (including the time the command remains in a queue of the hypervisor). The kernel latency may be reported from the datastore on which the virtual disk is stored (e.g., reported via an API of the hypervisor manager).

The network latency may be the average amount of time taken by the network to transmit a request from the host device to a storage system and transmit a reply (if necessary) from the storage system back to the host device. The network latency may be determined as the device latency reported from the datastore minus the storage latency reported by the storage system.

The device latency may be the average time taken by the host device to read from the storage system or write to the storage system (excluding any latency due to the host device). The device latency may be reported from the datastore on which the virtual disk is stored (e.g., reported via an API of the hypervisor manager).

The storage latency may be the average amount of time taken by the storage system to process a read or a write request. The storage latency may be reported from the storage system (e.g., via a storage system API of the storage system).

A latency time series may be displayed with supplemental information representing the above-described additive latency components, allowing an individual to visually determine the primary cause of latency over time.

In accordance with one embodiment, sensor measurements may be first pre-processed before being combined with other sensor measurements. For example, the device latency reported from the datastore and/or the storage latency from the storage system may first be pre-processed before the storage latency is subtracted from the device latency to arrive at the network latency. Likewise, the aggregate latency reported from the virtual disk and/or the aggregate latency reported from the datastore may be pre-processed before the aggregate latency reported from the datastore is subtracted from the aggregate latency reported from the virtual disk. The pre-processing may include data interpolation or data averaging (e.g., in the case where the rate of data reporting is different between the datastore and the storage system), data estimation (e.g., to fill in for missing data), time shifting (in the case where data samples are labeled with incorrect time stamps), etc.

In accordance with one embodiment, an analysis server may receive a first latency time series from a storage system, and a second latency time series from a hypervisor manager. The hypervisor manager may manage a hypervisor that interfaces a virtual machine of a host device with the storage system. The analysis server may process the first and second latency time series. The analysis server may then compute a third latency time series based on the respective processed versions of the first latency time series and the second latency time series. Finally, the analysis server may facilitate a display of the third latency time series on a client device.

These and other embodiments of the invention are more fully described in association with the drawings below.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps. While the sequence diagrams each present a series of steps in a certain order, the order of some of the steps may be changed.

Figure 1:
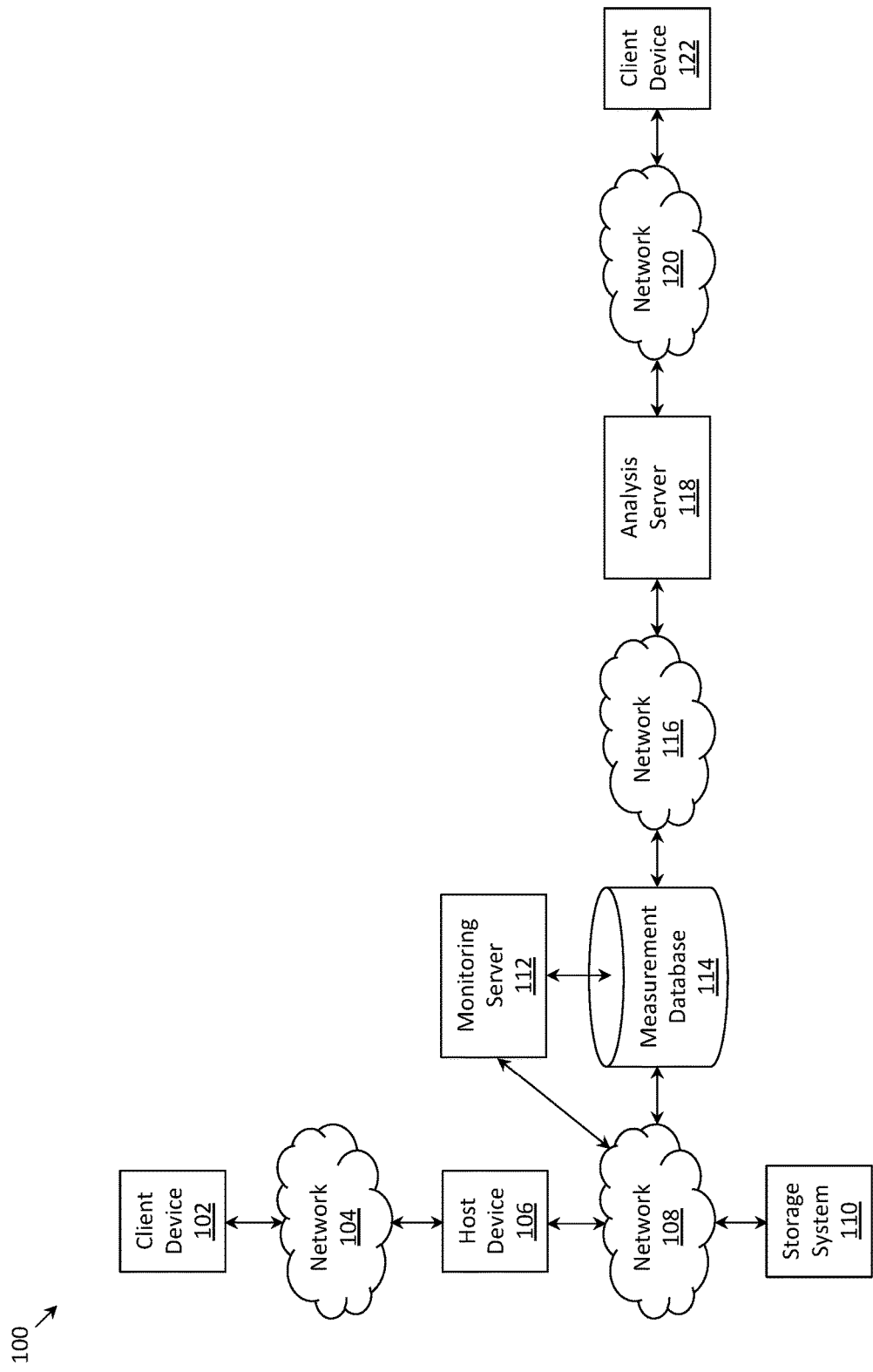
FIG. 1 depicts a system diagram of a communication path (including a client device, a host device and a storage system) and a monitoring/analysis path (including a monitoring server, a measurement datastore, an analysis server, and a client device) used to monitor and analyze sensor measurements taken at various points in the communication path, in accordance with one embodiment.
Figure 2:
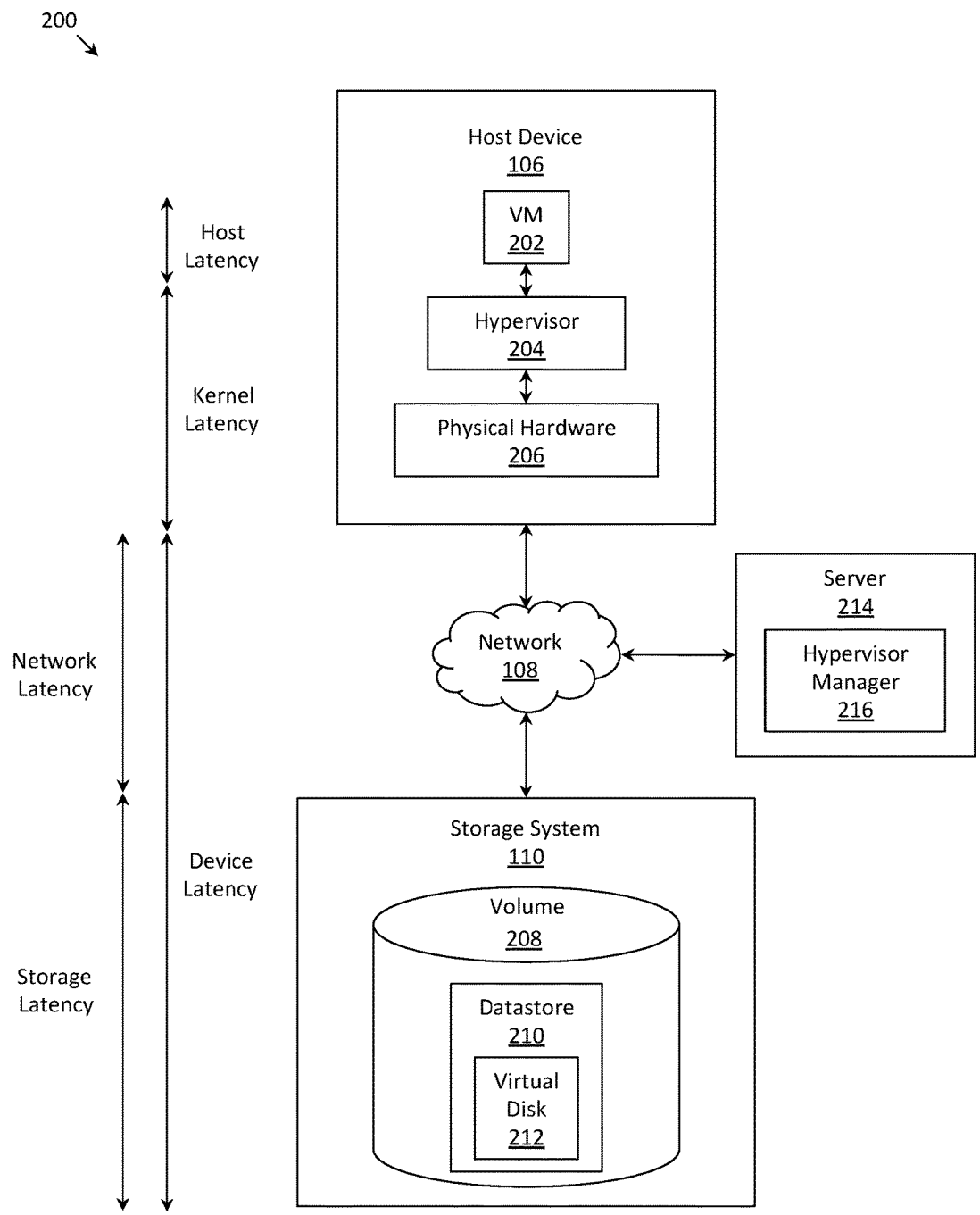
FIG. 2 depicts a system diagram in which a host device, hypervisor manager and storage system are communicatively coupled to one another, in accordance with one embodiment.

FIG. 1 depicts system diagram 100 of a communication path (including client device 102, network 104, host device 106, network 108, and storage system 110) and a monitoring/analysis path (including monitoring server 112, measurement database 114, network 116, analysis server 118, network 120, and client device 122) used to analyze and monitor sensor measurements taken at various points in the communication path, in accordance with one embodiment. Described in greater detail below in FIG. 2 are the sensor measurements taken along the portion of the communication path from host device 106, network 108 to storage system 110.

Client device 102 may transmit a request (e.g., request to access financial data, request to access email, request to upload video, etc.) to host device 106 on which an application is instantiated (e.g., application from financial enterprise, email application, video sharing application, etc.). In some instances, data may be directly retrieved from or stored on a storage medium of host device 106. In other instances, data may be retrieved from or stored on storage system 110, requiring host device 106 to transmit a read and/or write request to storage system 110 on behalf of client device 102.

In the monitoring/analysis path, sensor measurements may be collected from host device 106 and/or storage system 110 onto measurement database 114 via network 108 (e.g., an agent/daemon may be located on host device 106 and/or storage system 110 which sends sensor measurements to measurement database 114 via network 108). In addition or in the alternative, sensor measurements may be collected from host device 106 and/or storage system 110 by monitoring server 112 and then stored on measurement database 114. In yet another embodiment (not depicted), monitoring server 112 and measurement database 114 may be a part of host device 106 and/or storage system 110. Analysis server 118 may process the sensor measurements (such processing described with reference to FIG. 3 below) and facilitate the display of the resulting data on client device 122.

Client devices 102 and 122 may each be any of a desktop computer, a laptop, a mobile phone, a tablet computing device, or any other computing device. In some embodiments, client device 102 and 122 are part of a single computing device. Host device 106 may be a server, or any other computing device. Networks 104, 108, 116 and 120 may be any form of communications means and, in some cases, may be individual communications links (e.g., wired or wireless), or one or more communications networks, including private networks, public networks and/or virtual private networks over public networks.

FIG. 2 depicts system diagram 200, which is presented in order to illustrate portions of system diagram 100 in more detail. As depicted in system diagram 200, host device 106, hypervisor manager 216 and storage system 110 are communicatively coupled to one another. Virtual machine (VM) 202 and hypervisor 204 may be instantiated on host device 106, and hypervisor 204 may interface VM 202 and other VMs (not depicted) to physical hardware 206 of host device 106. Examples of a hypervisor include ESX™ (from VMware, Inc.™ of Palo Alto, Calif.), Hyper-V™ (from Microsoft Corp.™ of Redmond, Wash.), and the Xen Project™ (developed by the Linux Foundation™ of San Francisco, Calif.). VM 202 may include one or more software applications (i.e., often called "applications" or "apps" for brevity) and an operating system. Physical hardware 206 may include a processor (configured to execute computer readable instructions), memory (configured to store computer readable instructions and data), disk storage (also configured to store computer readable instructions and data), and related components. Because the storage capacity of physical hardware 206 may be limited, hypervisor 204 may also interface VM 202 with storage system 110 (which often has a significant amount of storage capacity).

Storage system 110 may be a Nimble Storage Array™ or a Nimble Storage All-Flash Array™ (both from Nimble Storage, Inc.™ of San Jose, Calif.). Volume 208 may be a logical portion of the storage space available on storage system 110 (i.e., defined by a set of logical addresses mapped to a set of physical addresses on the storage system). A portion of volume 208 may store datastore 210 (containing data and computer-readable instructions of hypervisor 204). The remainder of the description will assume a one-to-one correspondence between a datastore and a volume (for ease of description), although this relationship may not hold in general. A portion of datastore 210 may store virtual disk 212, also called a virtual machine disk or a VMDK (containing data and computer-readable instructions of VM 202). The remainder of the description will assume a one-to-one correspondence between a virtual disk and a datastore (for ease of description), although this relationship may not hold in general. The data of VM 202 may include data of an application of VM 202, data of an operating system of VM 202, the operational state of VM 202 (e.g., powered on, powered off, suspended, etc.), etc. Computer-readable instructions of VM 202 may encode an operating system of VM 202, an application of VM 202, etc.

Storage system 110 may communicate with hypervisor 204 via hypervisor manager 216. An example of a hypervisor manager is a vCenter Server™ from VMware, Inc. Hypervisor manager 216 may be instantiated on server 214, and server 214 may be part of monitoring server 112 (as depicted in FIG. 1). One task performed by hypervisor manager 216 is the collection of sensor measurements from host device 106. Hypervisor manager 216 may collect, among other things, sensor measurements regarding datastore 210, virtual disk 212 and hypervisor 204. Hypervisor manager 216 may additionally be configured to perform tasks unrelated to the collection of sensor measurements, such as taking a VM snapshot, etc. It is noted that storage system 110 may directly communicate with hypervisor 204 to collect sensor measurements without the assistance of hypervisor manager 216.

Sensor measurements of interest may include host latency, kernel latency, device latency, network latency and storage latency. The host latency may be the average amount of time taken by VM 202 to process a read or write command (including latency due to the application and guest operating system of the virtual machine). The kernel latency may be the average amount of time taken by hypervisor 204 (specifically the kernel of the hypervisor) to process a read or write command (including the time the command remains in a queue of the hypervisor). The device latency may be the average time taken by host device 106 to read from storage system 110 or write to storage system 110 (excluding any latency due to host device 106). The network latency may be the average amount of time taken by network 108 to transmit a request from host device 106 to storage system 110 and transmit a reply (if necessary) from storage system 110 back to host device 106. The storage latency may be the average amount of time taken by storage system 110 to process a read or a write request. As depicted in FIG. 2, the device latency may be equal to the sum of the network latency and the storage latency.

Figure 3:
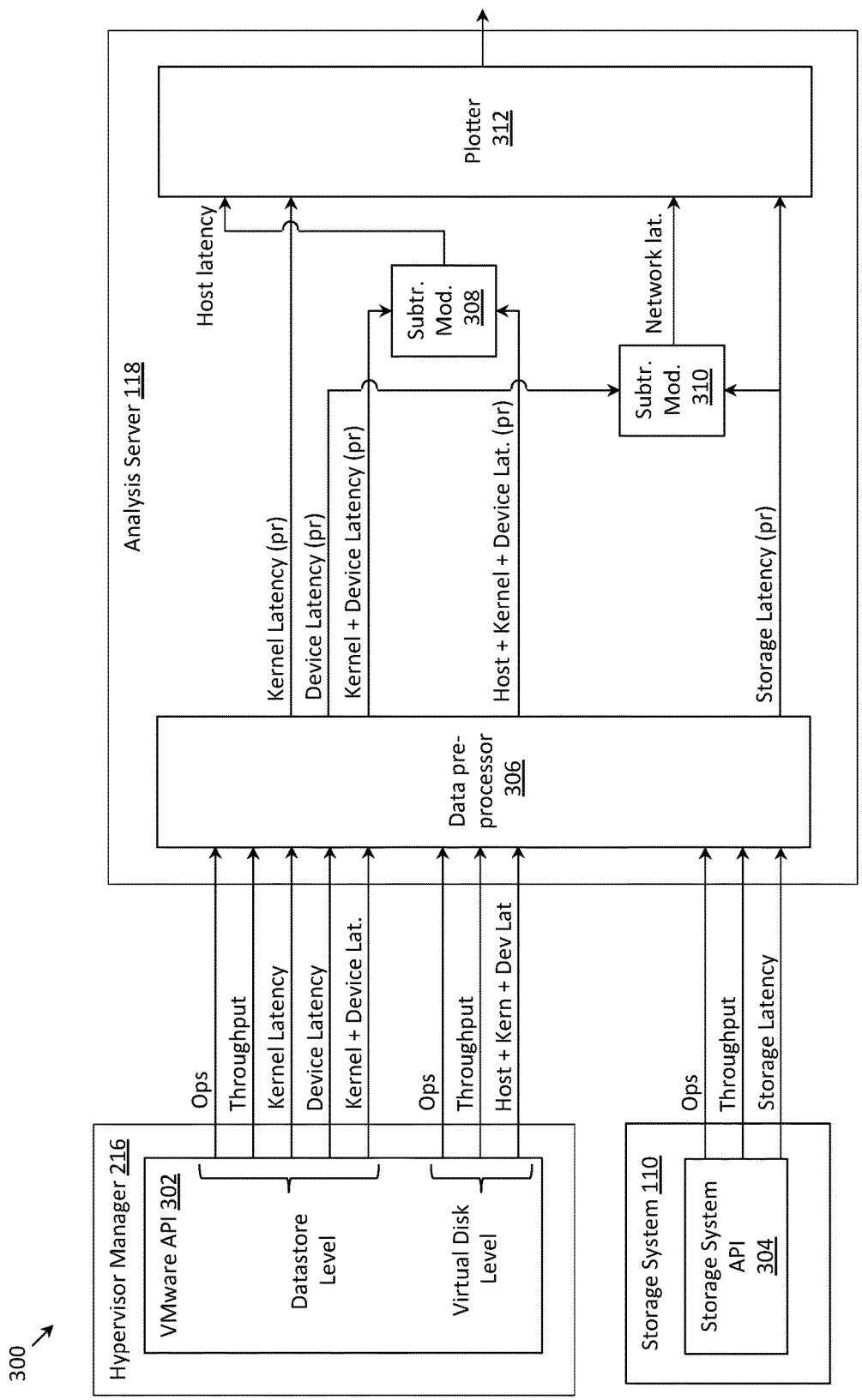
FIG. 3 depicts a system diagram within which sensor measurements are received and processed by an analysis server, in accordance with one embodiment.

FIG. 3 depicts system diagram 300 within which sensor measurements are received and processed by analysis server 118, in accordance with one embodiment. In system diagram 300, analysis server 118 is depicted as directly receiving a plurality of sensor measurements from hypervisor manager 216 and storage system 110. While this arrangement is possible, it is understood that FIG. 3 may be a simplified representation of FIG. 1, in which analysis server 118 may retrieve sensor measurements that are first stored on measurement database 114.

More specifically, analysis server 118 may receive a plurality of measurements from VMware application program interface (API) 302 (which may be a part of hypervisor manager 216). These measurements may concern datastore 210 (such measurement being reported from the "datastore level") and virtual disk 212 (such measurement being reported from the "virtual disk level"). The measurements at the "datastore level" may include the number of operations per second (abbreviated as "ops"), throughput, kernel latency, device latency, and the aggregate kernel+device latency. More specifically, the ops may refer to the average number of read operations performed on datastore 210 per second, or the average number of write operations performed on datastore 210 per second. The throughput may refer to the average number of bits read from datastore 210 per second, or the average number of bits written to datastore 210 per second. The kernel and device latency have been described above with respect to FIG. 2.

The measurements at the "virtual disk level" may include the number of operations per second (abbreviated as "ops"), throughput, and the aggregate host+kernel+device latency. More specifically, the ops may refer to the average number of read operations performed on virtual disk 212 per second, or the average number of write operations performed on virtual disk 212 per second. The throughput may refer to the average number of bits read from virtual disk 212 per second, or the average number of bits written to virtual disk 212 per second. The host, kernel and device latency have been described above with respect to FIG. 2.

Analysis server 118 may additionally receive a plurality of measurements from storage system API 304 (which may be a part of storage system 110). These measurements may include the number of operations per second (abbreviated as "ops"), throughput, and the storage latency. More specifically, the ops may refer to the number of read operations performed on volume 208 per minute, or the number of write operations performed on volume 208 per minute. The throughput may refer to the number of bits read from volume 208 per minute, or the number of bits written to volume 208 per minute. The storage latency has been described above with respect to FIG. 2. With error-free measurements and a one-to-one correspondence between volume 208 and datastore 210, the "ops" measurement from storage system API 304 should equal the "ops" measurement from the datastore level of VMware API 302 (for equal time intervals). Similarly, the "throughput" measurement from storage system API 304 should equal the "throughput" measurement from the datastore level of VMware API 302.

Data pre-processor 306 of analysis server 118 may pre-process (or, for ease of discussion, process) one or more of the received sensor measurements in order to compensate for one or more non-idealities present in the sensor measurements (e.g., truncation, errors, time delays, etc.). The specifics of the pre-processing are described below in FIGS. 4-6. After the pre-processing of the signals, the aggregate kernel+device latency reported from datastore 210 may be subtracted from the aggregate host+kernel+device latency reported from virtual disk 212 (via subtraction module 308) in order to arrive at the host latency. Similarly, the storage latency reported from storage system 110 may be subtracted from the device latency reported from datastore 210 (via subtraction module 310) in order to arrive at the network latency. The host latency, kernel latency, network latency and storage latency (e.g., pre-processed versions thereof) may be provided to plotter 312, which in turn facilitates the display of these additive latency components on client device 122. It is noted that in most cases a plot of the latency values over time is desired, as compared to the display of a latency value at a single time. A display of an example latency time series is provided in FIG. 7 below.

While not depicted in FIG. 3 (for clarity of presentation), the ops and throughput measurements from the datastore level, the ops and throughput measurements from the virtual disk level, and the ops and throughput measurements from the storage system may also be pre-processed by data pre-processor 306 and the processed versions thereof may be output from data pre-processor 306, and transmitted to plotter 312 for display.

While not depicted in FIG. 3 (for clarity of presentation), all the data transmitted to plotter 312 may also be stored in a storage device (not depicted) by analysis server 118. Such storage device may be located internally within analysis server 118 or external from analysis server 118. Storage of this data allows for plotter 312 (or other module) to access the data whenever the data is requested.

Figure 4:
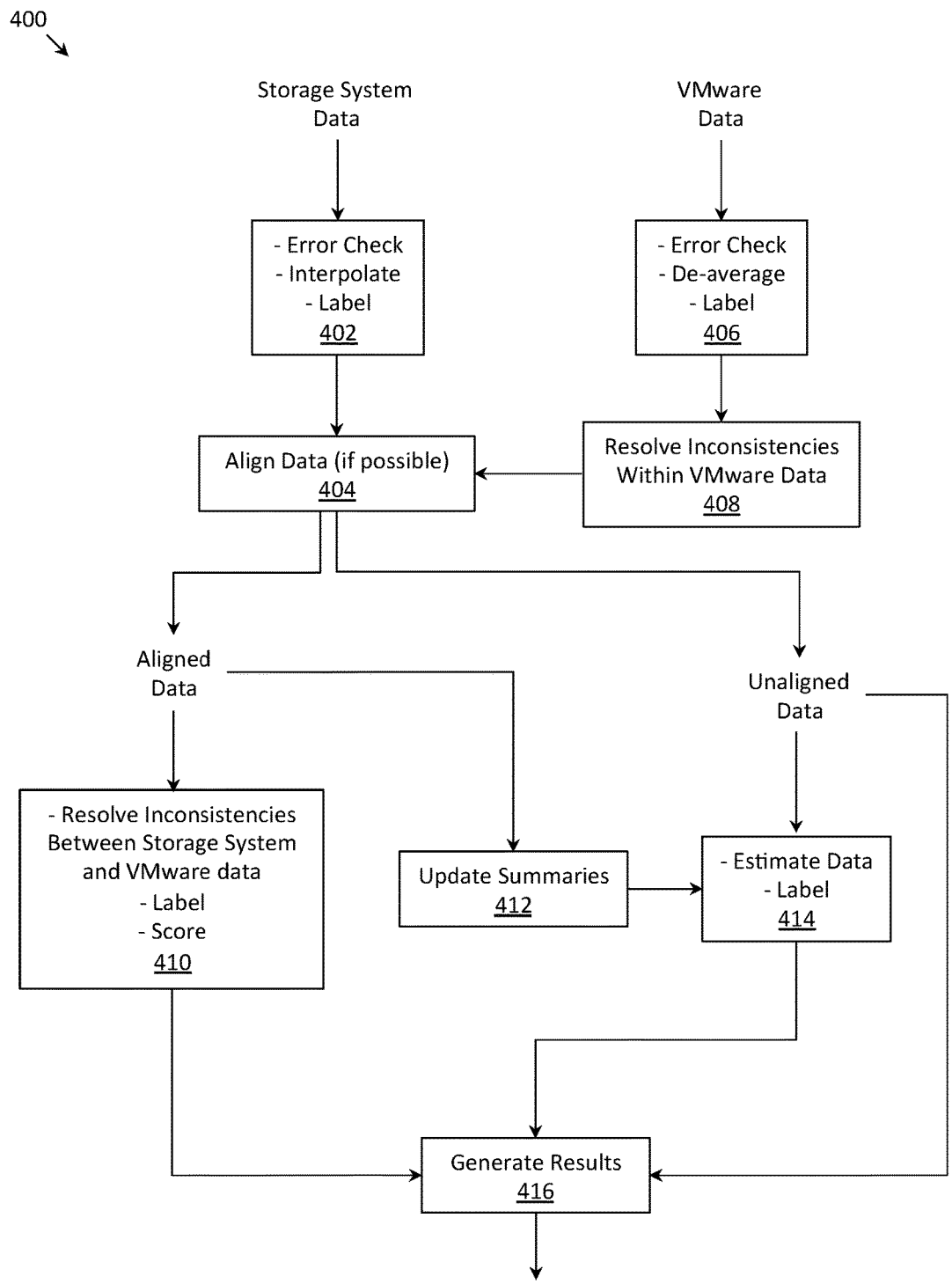
FIG. 4 depicts a flowchart of an algorithm for processing sensor measurements, in accordance with one embodiment.

FIG. 4 depicts flowchart 400 of an algorithm for processing sensor measurements, in accordance with one embodiment. Flowchart 400 accepts as input storage system data (including outputs of storage system API 304) and VMware data (including outputs of VMware API 302). At step 402, the storage system data may be error checked, interpolated and labeled. For example, if the number of reads were reported to be a negative number, such measurement would be erroneous. The negative number of reads along with the corresponding throughput and latency measurement for the same time period may be replaced with zeroes, and the measurements may be labeled as erroneous. Similarly, if a number of reads were greater than a certain threshold (e.g., threshold defining maximum number of reads possible in a given time period), such measurement would also be erroneous. The erroneously high number of reads along with the corresponding throughput and latency measurement for the same time period may be replaced with zeroes, and the measurements may be labeled as erroneous.

Figure 5:
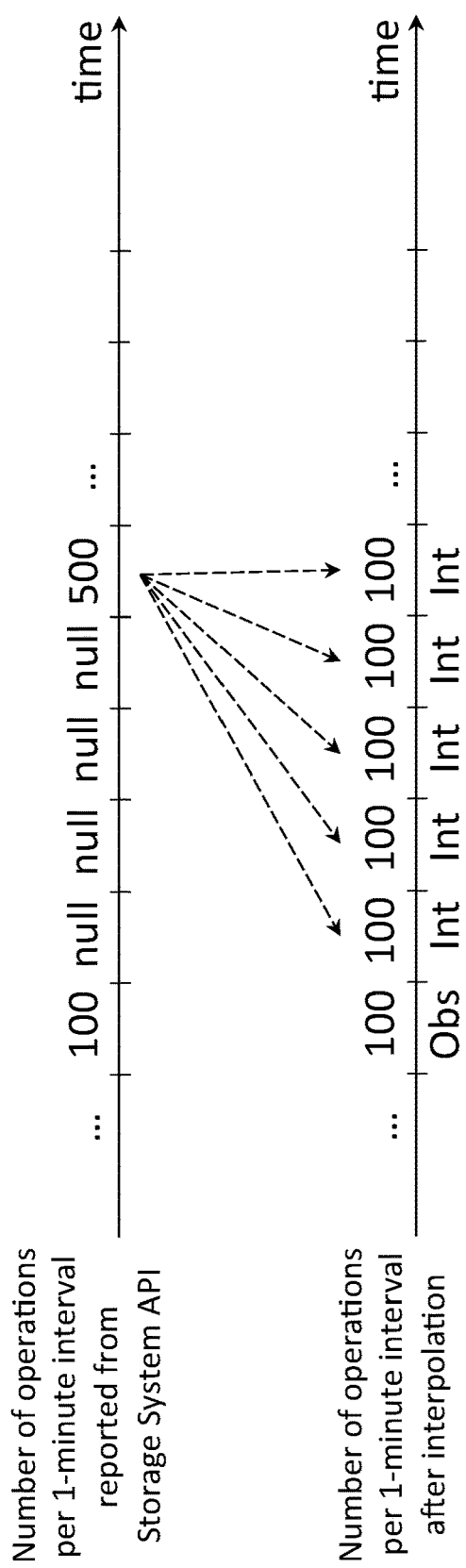
FIG. 5 depicts an example of interpolating data received from the storage system application program interface (API), in accordance with one embodiment.

Interpolation may occasionally be needed to address a sequence of null values followed by a large sensor value. Such data pattern may be the result of the storage system becoming too busy to report values (causing the sequence of null values), followed by the storage system reporting a sum of the missed-reported values. The top plot depicted in FIG. 5 provides an example of the number of operations reported for 1-minute intervals by the storage system. The storage system first reports 100 operations for the first interval, followed by null for the four following intervals, followed by 500 operations for the sixth interval. In an interpolation routine, the aggregate value (i.e., after the sequence of null values) may be divided by the number of null intervals (i.e., intervals with a null value) plus one. In the instant example, 500 is divided by (4+1), resulting in 100. The resulting value may be populated in the null intervals, as well as the interval with the aggregate number. The data resulting from the interpolation routine is depicted in the bottom plot of FIG. 5. The resulting data may also be labeled as observed (Obs) or interpolated (Int). In the example of FIG. 5, the measurement in the first interval was an observed value, whereas the measurements in the second through sixth intervals were interpolated values.

At step 406, VMware data may be error checked, de-averaged and labeled. Similar to the storage system data, any negative read counts might be replaced with zero, and labeled as an error. VMware data is typically measured and averaged over a 20-second interval, whereas the storage system data is typically measured over a 1-minute interval. To allow comparisons to be performed across the two data sets, a "de-averaging" operation may be performed on the VMware data. Taking the example of a VMware sensor measurement indicating 4 reads per second (which is the result of averaging a total number of reads over a 20 second interval), a "de-averaging" operation may calculate a range of total read operations that are possible over the 20 second interval to be 80-99 (assuming that averaged values are rounded down to the nearest integer). More generally, the de-averaging operation may compute the range with lower value=(measured number of operations)*20 and upper value=(measured number of operations+1)*20−1. Assuming that three adjacent 20-second intervals of the VMware data are aligned with a 1-minute interval of the storage system data, the de-averaged values from the three adjacent 20-second intervals may be summed and compared to the value from the 1-minute interval. For example, suppose the de-averaged values of 80±10, 40±10, 60±10 were calculated for three adjacent 20-second intervals, the aggregated value of 180±30 from the VMware data could be compared to the value (e.g., 160) from the 1-minute interval of the storage system data.

At step 408, any inconsistencies may be resolved within the VMware data. For example in any given interval, the number of reads (or writes) from the virtual disk level should equal or exceed the number of reads (or writes) from the data store level, since the virtual disk level may include extra activity from the host (e.g., activity from application and/or operating system running on VM 202). If this condition were violated, the associated measurements may be marked as erroneous. In addition or in the alternative, the inconsistent data may be resolved based on additional information (e.g., whether the datastore data or the virtual disk data is more trustworthy). If no additional information is available, the inconsistent data may be populated with zeros to avoid the propagation of erroneous values.

At step 404, the storage system data may be aligned with the VMware data (if possible). Data alignment may be performed if the storage system data and VMware data are both available for the same time period (i.e., storage system data is available for a 1-minute interval and VMware data is available for three adjacent 20-second intervals which approximately correspond to the 1-minute interval). In contrast, data alignment may not be performed if one or more of the storage system data and VMware data are not available for the same time period. The most common scenario is the VMware data being available, and the storage system data being delayed (and hence not being available). Steps 412 and 414 (described below) handle the scenario when only the VMware data is available.

Figure 6:
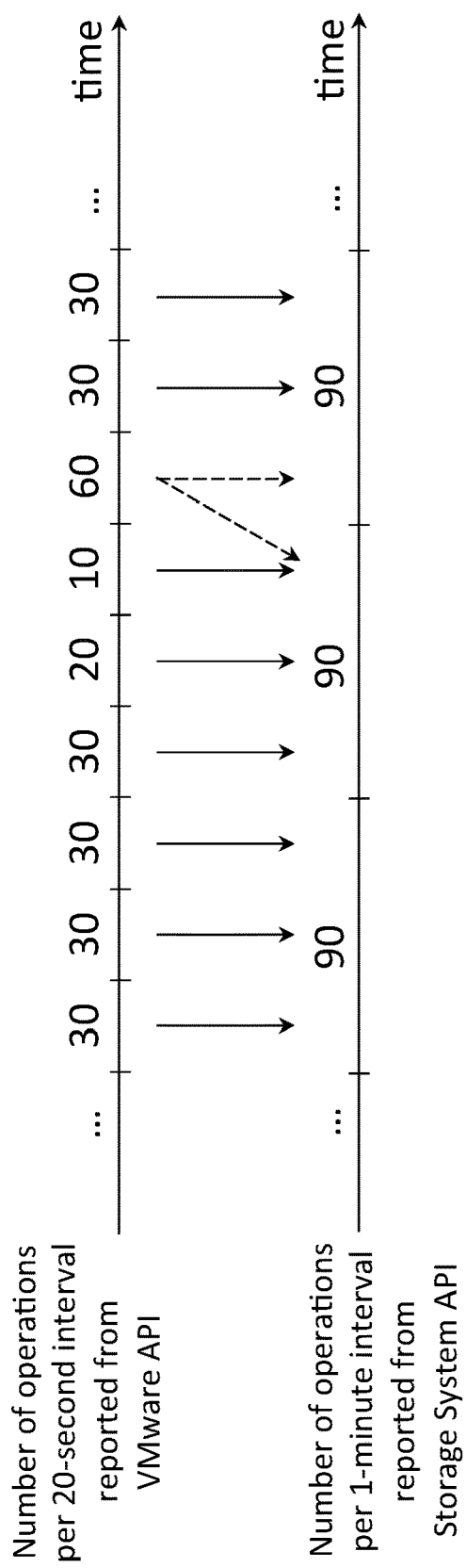
FIG. 6 depicts an example alignment of time periods from the VMware API with time periods from the storage system API, in accordance with one embodiment.

FIG. 6 provides an example of aligning VMware data with storage system data, in accordance with one embodiment. Typically, VMware data and storage system data contain timestamps. Based on these timestamps, an approximate correspondence can be established between 20-second VMware intervals and 1-minute storage system intervals. In the example of FIG. 6, it is assumed for simplicity that the boundaries of the 20-second intervals align with the boundaries of the 1-minute intervals (while this is not true in general). In the first 1-minute interval, 90 operations are recorded, and in the corresponding three 20-second intervals, 30 operations are recorded for each of the 20-second intervals. It is noted that, in FIG. 6, discrete operation counts for each of the 20-second intervals are depicted for ease of description, while in a more realistic scenario, ranges (e.g., 30±10) would be provided for each of the 20-second intervals.

Since the total number of operations reported from VMware (i.e., 30+30+30) equals the total number of operations reported from the storage system (i.e., 90) for this first 1-minute interval, no alignment would be needed for this first 1-minute interval. In the second 1-minute interval, an inconsistency is present as the total number of operations reported from VMware (i.e., 30+20+10) does not equal the total number of operations reported from the storage system (i.e., 90). Likewise, in the third 1-minute interval, an inconsistency is present as the total number of operations reported from VMware (i.e., 60+30+30) does not equal the total number of operations reported from the storage system (i.e., 90).

Based on past observation, the cause of the inconsistency depicted in the simplified example of FIG. 6 can most easily be explained by operations occurring in one interval being partially reported in a later interval. For instance, in the fifth 20-second interval, which reported 20 operations, such interval likely had 30 operations, but 10 of these operations were likely reported in the seventh 20-second interval with 60 operations. Likewise, in the sixth 20-second interval, which reported 10 operations, such interval likely had 30 operations, but 20 of these operations were likely reported in the seventh 20-second interval with 60 operations. To address such inconsistencies, the alignment procedure of step 404 assigns 50% of the operations from the seventh interval to the second 1-minute interval, and 50% of the operations from the seventh interval to the third 1-minute interval. As a result of such assignment, one can observe that the number of operations for each 1-minute interval is now consistent between the two data sets. In general, the percentages used to split-up the data within a 20-second interval may be determined via a least squares technique which minimizes a squared error.

Once the 50/50 assignment (or assignment with other percentages) is determined, it is applied to the throughput and latency data as well. For instance, suppose the latency for the seventh 20-second interval were 4 ms/operation. This would mean the seventh 20-second interval experienced a total latency of 240 ms (i.e., 4 ms/operation*60 operations). As a result of the 50/50 assignment, 120 ms would be added to the latency of the second 1-minute interval, leaving the seventh 20-second interval contributing 120 ms of latency to the third 1-minute interval.

In FIG. 6, the boundaries between the time intervals of the two data sets were aligned. In a more realistic scenario, the boundaries may not be aligned, resulting in a more systematic assignment of data for each 20-second interval that straddles two minute-intervals. Based on past observation, the two data sets often exhibit a time offset causing the boundaries of the time intervals to not align, and this time offset may be variable over time.

In the example above, the inconsistency between the two data sets was resolved by a 50/50 assignment. More generally, inconsistencies may not be completely eliminated by the alignment procedure, but can only be reduced. For instance, if the seventh 20-second interval of FIG. 6 had 30 operations instead of 60 operations, the operation count of the VMware dataset would be below the operation count of the storage system dataset (for these three 1-minute intervals) regardless of the alignment procedure. Any inconsistency that still remains between the two datasets may be addressed at step 410. Inconsistencies between the two dataset may be resolved based on additional information (e.g., whether the VMware data or the storage system data is more trustworthy). If the VMware data is more trustworthy, the VMware data may be preserved, while the storage system data may be populated with zeros to avoid the propagation of erroneous values. If the storage system data is more trustworthy, the storage system data may be preserved, while the VMware data may be populated with zeros to avoid the propagation of erroneous values. If no additional information is available, both datasets may be populated with zeros (i.e., within certain time intervals), to avoid the propagation of erroneous values. Any data that is replaced with zeros may be labeled as erroneous. In one embodiment, inconsistencies between the datasets may be left unresolved, and instead a score may be generated and reported which indicates the trustworthiness of the data (e.g., lower score reported for data with higher inconsistencies).

Based on past observation, it is suspected that very high average latency values are the result of a properly measured absolute latency value and an underreported number of operations. For example, a device latency value [ms/operation] may be calculated by VMware as the total device latency over a 20-second interval divided by the number of operations over the 20-second interval. The denominator of this ratio being erroneously low can result in an erroneously high ratio (i.e., erroneously high average latency measurement). To address such potential inaccuracies, whenever the operations from the VMware data are suspected to be erroneously low (e.g., via the alignment procedure of step 404), the device latency value can be corrected by removing the erroneous denominator (e.g., multiplying the device latency value by the VMware operation count) and dividing the resulting product by a more trustworthy denominator (e.g., dividing the resulting product by the operation count from the storage system).

Returning to the discussion of unaligned data, the processing of unaligned data is performed at steps 412 and 414. As mentioned above, unaligned data refers to VMware data without any corresponding storage system data. Therefore, "unaligned data" does not refer to VMware data that is misaligned with storage system data, but rather refers to VMware data that cannot be aligned with storage system data (due to the unavailability of the latter). The goal of processing the "unaligned data" is to estimate the missing storage system data, which includes the ops, throughput and storage latency of volume 208. The ops and throughput of volume 208 can be estimated based on the ops and throughput provided at the datastore level (since there is a direct correspondence between these values). There, however, is no corresponding measurement for the storage latency from the VMware data. To estimate the storage latency, the storage latency fraction of the device latency (i.e., storage latency divided by device latency) is computed (at step 412) over a lengthy period of the aligned data (e.g., six hours). The device latency reported in the unaligned VMware data may be multiplied by such fraction to estimate the storage latency (at step 414). The resulting storage latency value may be labeled as an estimate (at step 414) so that it may be substituted with an observed value at a later time when the observed value becomes available. When available, aligned data (i.e., the resulting data of step 410) is used to generate results (e.g., calculate host and/or network latency) in step 416. Otherwise, unaligned data (i.e., unaligned data itself or the resulting data of step 414) is used to generate results (e.g., calculate host and/or network latency) in step 416.

For completeness, correspondences between FIGS. 3 and 4 are noted. Steps 402, 404, 406, 408, 410, 412 and 414 of FIG. 4 may be performed by data pre-processor 306 of FIG. 3, and step 416 of FIG. 4 may be performed by subtraction modules 308 and 310, and plotter 312 of FIG. 3. For example, "storage latency (pr)" of FIG. 3 may be based on the resulting data of step 410 of FIG. 4 when aligned data is available; otherwise, "storage latency (pr)" may be based on the resulting data of step 414 of FIG. 4 when aligned data is not available.

Figure 7:
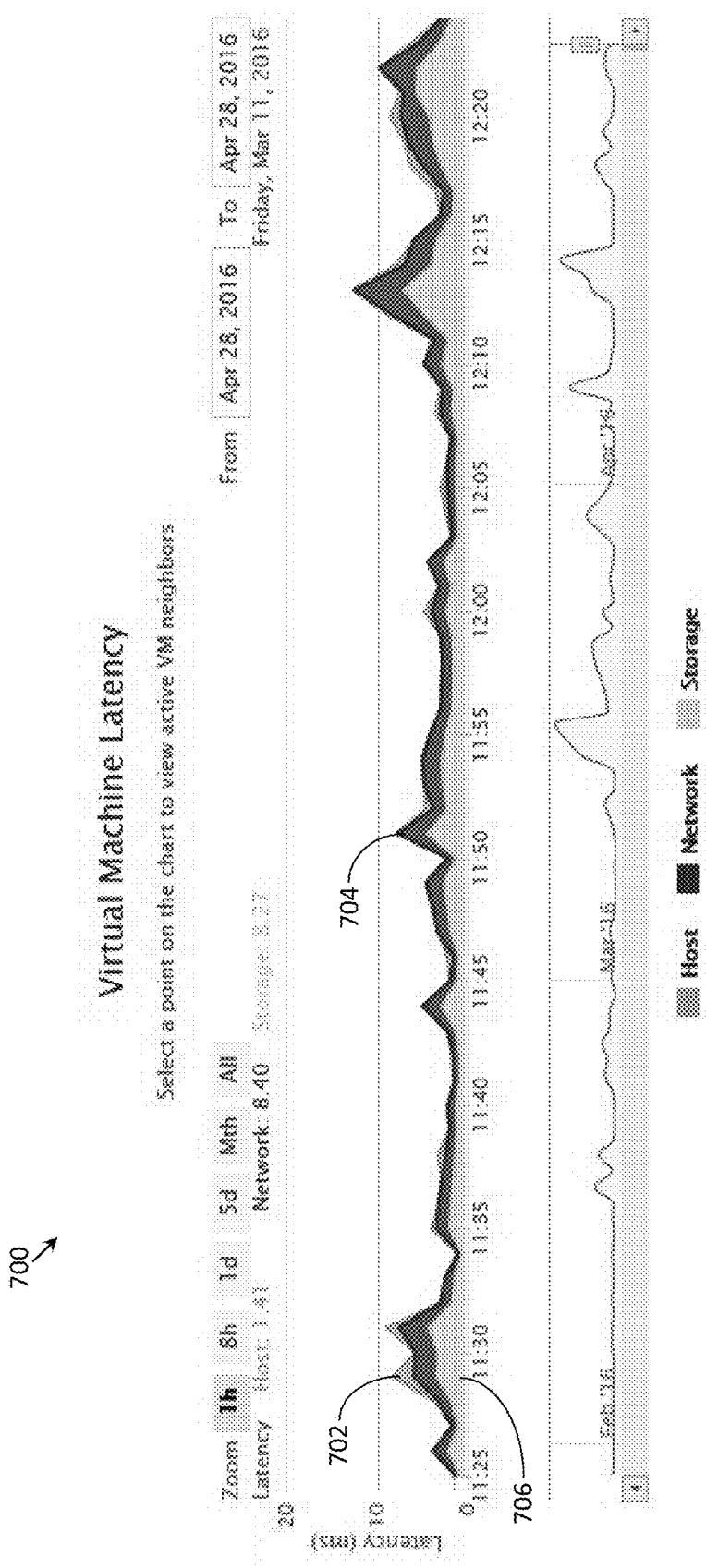
FIG. 7 depicts a plot of virtual machine latency over time superimposed with a breakdown of its additive latency components, in accordance with one embodiment.

FIG. 7 depicts plot 700 of virtual machine latency over a one-hour duration superimposed with a breakdown of its additive latency components, in accordance with one embodiment. The additive latency components depicted in FIG. 7 are host latency (702), network latency (704) and storage latency (706). While kernel latency has been described above in FIGS. 2 and 3, kernel latency is not depicted in FIG. 7 for simplicity. The time units displayed on the x-axis are [hour]:[minute], and values for the y-axis are provided in milliseconds (ms). Below the plot of virtual machine latency over the one-hour duration is a plot of virtual machine latency over a larger time window (e.g., from February 2016 to April 2016).

Figure 8:
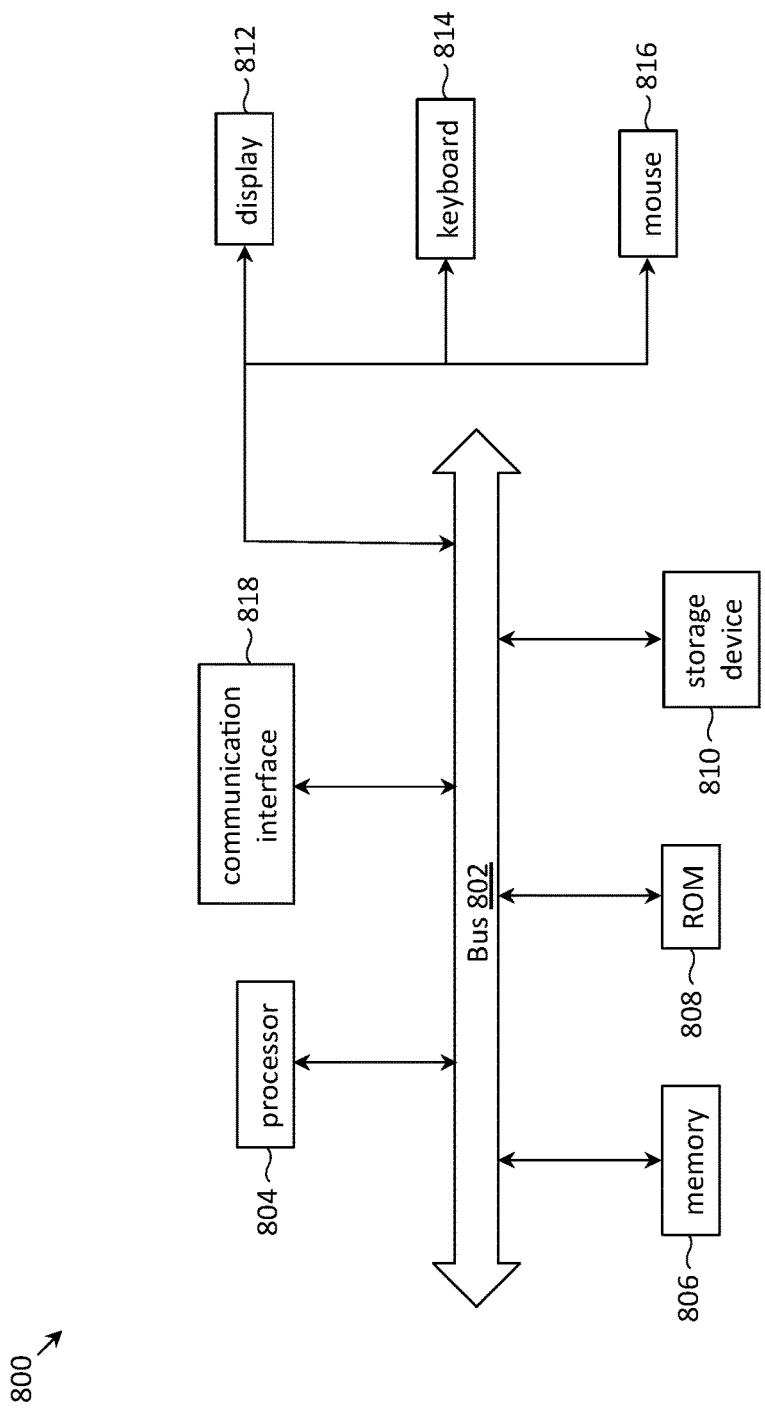
FIG. 8 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 8 provides an example of a system 800 that is representative of any of the computing systems discussed herein (e.g., client device 102, host device 106, storage system 110, monitoring server 112, analysis server 118 and client device 122). Note, not all of the various computer systems have all of the features of system 800. For example, certain ones of the computer systems discussed above may not include a display inasmuch as the display function may be provided by a client computer communicatively coupled to the computer system or a display function may be unnecessary. Such details are not critical to the present invention.

System 800 includes a bus 802 or other communication mechanism for communicating information, and a processor 804 coupled with the bus 802 for processing information. Computer system 800 also includes a main memory 806, such as a random access memory (RAM) or other dynamic storage device, coupled to the bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to the bus 802 for storing static information and instructions for the processor 804. A storage device 810, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 804 can read, is provided and coupled to the bus 802 for storing information and instructions (e.g., operating systems, applications programs and the like).

Computer system 800 may be coupled via the bus 802 to a display 812, such as a flat panel display, for displaying information to a computer user. An input device 814, such as a keyboard including alphanumeric and other keys, may be coupled to the bus 802 for communicating information and command selections to the processor 804. Another type of user input device is cursor control device 816, such as a mouse, a trackball, or cursor direction keys for communicating direction information and command selections to processor 804 and for controlling cursor movement on the display 812. Other user interface devices, such as microphones, speakers, etc. are not shown in detail but may be involved with the receipt of user input and/or presentation of output.

The processes referred to herein may be implemented by processor 804 executing appropriate sequences of computer-readable instructions contained in main memory 806. Such instructions may be read into main memory 806 from another computer-readable medium, such as storage device 810, and execution of the sequences of instructions contained in the main memory 806 causes the processor 804 to perform the associated actions. In alternative embodiments, hard-wired circuitry or firmware-controlled processing units (e.g., field programmable gate arrays) may be used in place of or in combination with processor 804 and its associated computer software instructions to implement the invention. The computer-readable instructions may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1100 or similar electronic computing device, that manipulates and transforms data represented as physical (electronic) quantities within its registers and memories into other data similarly represented as physical quantities within its memories or registers or other such information storage, transmission or display devices.

Computer system 800 also includes a communication interface 818 coupled to the bus 802. Communication interface 818 may provide a two-way data communication channel with a computer network, which provides connectivity to and among the various computer systems discussed above. For example, communication interface 818 may be a local area network (LAN) card to provide a data communication connection to a compatible LAN, which itself is communicatively coupled to the Internet through one or more Internet service provider networks. The precise details of such communication paths are not critical to the present invention. What is important is that computer system 800 can send and receive messages and data through the communication interface 818 and in that way communicate with hosts accessible via the Internet.

Thus, methods and systems for pre-processing sensor measurements in order to decompose an aggregate latency measurement into its additive latency components have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
receiving, by a processor, a first time series of storage latency from a storage system, wherein each storage latency of the first time series represents a time taken by the storage system to process a read or a write request;
receiving, by the processor, a second time series of device latency from a hypervisor manager, the hypervisor manager managing a hypervisor that interfaces a virtual machine of a host device with the storage system via a network, wherein each device latency of the second time series represents a time taken by the host device to read from the storage system or write to the storage system via the network;
receiving, by the processor, a third time series of kernel latency from the hypervisor manager, wherein each kernel latency of the third time series represents a time taken by a kernel of the hypervisor to process the read or the write request including a time that the read or the write request remains in a queue of the hypervisor;
computing, by the processor, a fourth time series of host latency based on the second time series of device latency and the third time series of kernel latency received from the hypervisor manager, wherein each host latency in the fourth time series represents a time taken by the virtual machine of the host device to process the read or write request;
computing, by the processor, a fifth time series of network latency by subtracting a respective storage latency of the first time series from a respective device latency of the second time series to obtain each network latency of the fifth time series, wherein each network latency of the fifth time series represents a time taken by the network to transmit the read or write request and a reply of the read or write request; and facilitating, by the processor, a display of the first time series of storage latency, the fourth time series of host latency, and the fifth time series of network latency.

2. The method of claim 1, wherein the time taken by the storage system to process the read or write request is an average time taken by the storage system to process the read or write request over the time period.

3. The method of claim 1, wherein the time taken by the host device to read from the storage system or write to the storage system is an average time taken by the host device to read from the storage system or write to the storage system via the network over a time period.

4. The method of claim 1, comprising: processing the second time series of device latency by temporally arranging samples of the second time series of device latency with respect to samples of the first time series of storage latency.

5. The method of claim 1, comprising: processing the first time series of storage latency by substituting estimated samples in place of missing samples of the first time series of storage latency.

6. The method of claim 1, comprising: processing the second time series of device latency by substituting erroneous samples of the second time series with zero values.

7. The method of claim 1, wherein computing the fourth time series of host latency comprises:
determining a time series of aggregate kernel and device latency;
determining a time series of aggregate host, kernel, and device latency; and
subtracting the time series of aggregate kernel and device latency from the time series of aggregate host, kernel, and device latency.

8. An analysis server, comprising:
a processor; and
a memory storing a set of instructions that, when executed by the processor, causes the processor to:
receive a first time series of storage latency from a storage system, wherein each storage latency in the first time series represents an average time taken by the storage system to process a read or a write request;
receive a second time series of device latency from a hypervisor manager, the hypervisor manager managing a hypervisor that interfaces a virtual machine of a host device with the storage system via a network, wherein each device latency in the second time series represents a time taken by the host device to read from the storage system or write to the storage system via the network;
receive a third time series of kernel latency from the hypervisor manager, wherein each kernel latency in the third time series represents a time taken by a kernel of the hypervisor to process the read or the write request including a time that the read or the write request remains in a queue of the hypervisor;
compute a fourth time series of host latency based on the second time series of device latency and the third time series of kernel latency received from the hypervisor manager, wherein each host latency in the fourth time series represents a time taken by the virtual machine of the host device to process the read or write request;
compute a fifth time series of network latency by subtracting a respective storage latency of the first time series from a respective device latency of the second time series to obtain each network latency of the fifth time series, wherein each network latency of the fifth time series represents a time taken by the network to transmit the read or write request and a reply of the read or write request; and
facilitate a display of the first time series of storage latency, the fourth time series of host latency, and the fifth time series of network latency.

9. The analysis server of claim 8, wherein the storage latency represents an average time taken by the storage system to process a read or a write request, the storage latency being averaged over a time period.

10. The analysis server of claim 8, wherein the device latency represents an average time taken by the host device to read from the storage system or write to the storage system, the device latency being averaged over a time period.

11. The analysis server of claim 8, wherein the set of instructions is executable to cause the processor to temporally arrange samples of the second time series of device latency with respect to samples of the first time series of storage latency.

12. The analysis server of claim 8, wherein the set of instructions is executable to cause the processor to process the first time series of storage latency by substituting estimated samples in place of missing samples of the first time series of storage latency.

13. The analysis server of claim 8, wherein the set of instructions is to cause the processor to process the second time series of device latency by substituting erroneous samples of the second latency times series with zero values.

14. The analysis server of claim 8, wherein to compute the fifth time series of host latency, the set of instructions is executable to cause the processor to:
determine a time series of aggregate kernel and device latency;
determine a time series of aggregate host, kernel, and device latency; and
subtract the time series of aggregate kernel and device latency from the time series of aggregate host, kernel, and device latency.

15. A non-transitory machine-readable storage medium comprising machine readable instructions that, when executed by a processor, cause the processor to:
receive a first time series of storage latency from a storage system, wherein each storage latency of the latency time series represents a time taken by the storage system to process a read or a write request;
receive a second time series of device latency from a hypervisor manager, the hypervisor manager managing a hypervisor that interfaces a virtual machine of a host device with the storage system via a network, wherein each device latency of the second time series represents a time taken by the host device to read from the storage system or write to the storage system via the network;
receive a third time series of kernel latency from the hypervisor manager, wherein each kernel latency in the third time series represents a time taken by a kernel of the hypervisor to process the read or the write request including a time that the read or the write request remains in a queue of the hypervisor;
compute a fourth time series of host latency based on the second time series of device latency and the third time series of kernel latency received from the hypervisor manager, wherein each host latency of the fourth time series represents a time taken by the virtual machine of the host device to process the read or write request;
compute a fifth time series of network latency by subtracting a respective storage latency of the first time series from a respective device latency of the second time series to obtain each network latency of the fifth time series, wherein each network latency in the fifth time series represents a time taken by the network to transmit the read or write request and a reply of the read or write request; and facilitate a display of the first time series of storage latency, the fourth time series of host latency, and the fifth time series of network latency.

16. The non-transitory machine-readable storage medium of claim 15, wherein the storage latency represents an average time taken by the storage system to process a read or a write request, the storage latency being averaged over a time period.

17. The non-transitory machine-readable storage medium of claim 15, wherein the device latency represents an average time taken by the host device to read from the storage system or write to the storage system, the device latency being averaged over a time period.

18. The non-transitory machine-readable storage medium of claim 15, wherein the machine-readable instructions are executable to cause the processor to temporally arrange samples of the second time series of device latency with respect to samples of the first time series of storage latency.

19. The non-transitory machine-readable storage medium of claim 15, wherein the machine readable instructions are executable to cause the processor to process the first time series of storage latency by substituting estimated samples in place of missing samples of the first time series of storage latency.

20. The non-transitory machine-readable storage medium of claim 15, wherein the machine readable instructions are executable to cause the processor to process the second time series of device latency by substituting erroneous samples of the second times series with zero values.

* * * * *